US009639685B2

(12) United States Patent
Anderson (10) Patent No.: US 9,639,685 B2
(45) Date of Patent: May 2, 2017

(54) AUTHENTICATION OF GESTURE INPUT THROUGH RFID SCANS

(71) Applicant: Intel Corporation, Santa Clara, CA (US)

(72) Inventor: Glen J. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/751,216

(22) Filed: Jun. 26, 2015

(65) Prior Publication Data

US 2016/0378963 A1   Dec. 29, 2016

(51) Int. Cl.
| | |
|---|---|
| *G06F 21/00* | (2013.01) |
| *G06F 21/32* | (2013.01) |
| *G06F 3/01* | (2006.01) |
| *G06F 1/16* | (2006.01) |
| *G06F 21/62* | (2013.01) |
| *G06F 21/36* | (2013.01) |

(52) U.S. Cl.
CPC .............. *G06F 21/32* (2013.01); *G06F 1/163* (2013.01); *G06F 3/017* (2013.01); *G06F 21/36* (2013.01); *G06F 21/6218* (2013.01)

(58) Field of Classification Search
CPC ................ G06F 21/33–21/34; G06F 21/45
USPC .......................................................... 726/19
See application file for complete search history.

(56) References Cited

U.S. PATENT DOCUMENTS

| | | | |
|---|---|---|---|
| 7,315,908 B2 | 1/2008 | Anderson | |
| 2010/0083373 A1 | 4/2010 | White et al. | |
| 2013/0171971 A1 | 7/2013 | Fuji et al. | |
| 2013/0317848 A1* | 11/2013 | Savin | G06Q 10/10 705/3 |
| 2014/0239065 A1 | 8/2014 | Zhou et al. | |
| 2015/0070134 A1 | 3/2015 | Nagisetty et al. | |
| 2015/0120553 A1 | 4/2015 | Li | |
| 2015/0278498 A1* | 10/2015 | Hong | G06F 21/32 340/5.82 |

OTHER PUBLICATIONS

Huang et al., "An Ultra-low Power Passive UHF RFID Transponder with Self-calibrated Clock Generator", IEEE Conference on RFID, Apr. 2010, pp. 77-82, Institute of Electrical and Electronic Engineers.

Chris Woodford, "How do pedometers work?", www.explainthatstuff.com, Oct. 3, 2014, 8 pages.

Xu et al., "A High-Stability Clock Generator for 13.56MHz Passive RFID Tags", IEEE Conference on EDSSC, Dec. 2012, 2 pages, Institute of Electrical and Electronic Engineers.

(Continued)

*Primary Examiner* — Anthony Brown
(74) *Attorney, Agent, or Firm* — Jordan IP Law, LLC (57) ABSTRACT

Systems, apparatuses and methods may provide for receiving one or more radio frequency identifier (RFID) codes from a passive wearable device and identifying gesture input in at least one of the RFID code(s). Additionally, access to a computing system may be granted if the gesture input corresponds to a known gesture. In one example, identifying the gesture input includes detecting a change in at least one of the RFID code(s) and the detected change is compared to an expected change associated with the known gesture.

25 Claims, 6 Drawing Sheets

(56) References Cited

OTHER PUBLICATIONS

Yeager et al., "WISP: A Passively Powered UHF RFID Tag with Sensing and Computation", RFID Handbook: Applications, Technology. Security, and Privacy, Mar. 2008, 32 pages, Seattle WA.
International Search Report and Written Opinion for International Patent Application No. PCT/US2016/033745, mailed Sep. 8, 2016, 13 pages.

* cited by examiner

AUTHENTICATION OF GESTURE INPUT THROUGH RFID SCANS

TECHNICAL FIELD

Embodiments generally relate to authentication. More particularly, embodiments relate to authentication of gesture input through radio frequency identifier (RFID) scans.

BACKGROUND

Authentication may be used to grant or deny access to a wide variety of systems such as, for example, web site servers, handheld devices and shared terminals (e.g., automated teller machines/ATMs, kiosks). While conventional authentication solutions may be suitable under certain circumstances, there remains considerable room for improvement. For example, touch screen authentication may involve physical interaction between the user and a touch sensitive display of the system during the authentication process, wherein the user may have difficulty remembering and/or entering passwords, personal identification numbers (PINs) and/or user identifiers (IDs). Additionally, air gesture authentication may involve the use of peripheral cameras to capture video footage of hand gestures made by the user. In such an approach, relatively expensive cameras that draw significant amounts of power may use a relatively large amount of storage space to record and process the video footage. In another approach, a separate device may be used to capture motion input from the user, wherein the separate device may be powered throughout the authentication process. In addition to the increased power consumption of such an approach, the separate device may be cumbersome to hold/manipulate.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1A:
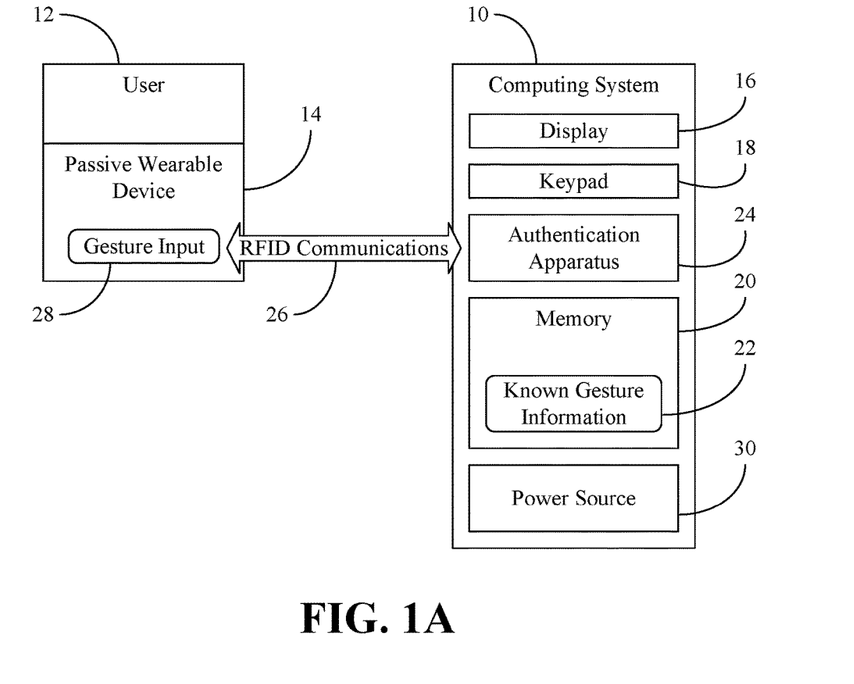
FIG. 1A is a block diagram of an example of a wireless communication between a computing system and a passive wearable device according to an embodiment.

Turning now to FIG. 1A, an authentication scenario is shown in which a user 12 of a passive wearable device 14 attempts to access a secure computing system 10. The computing system 10 may include, for example, a web site server, handheld device, shared terminal (e.g., ATM, kiosk), and so forth. Therefore, the illustrated computing system 10 includes a display 16, keypad 18, or other suitable user interface (UI) device to facilitate interaction with the computing system 10 on the part of the user 12 (e.g., after successful authentication). The computing system 10 may also include a memory 20 to store information 22 regarding one or more known gestures. The information 22 may also be associated with the user 12 during, for example, a training session with the user 12 or appropriate population sample. As will be discussed in greater detail, the information 22 may include one or more radio frequency identifier (RFID) passcodes that correspond to gestures such as, for example, hand gestures that may be made by the user 12 in order to gain access to the computing system 10.

More particularly, the illustrated computing system 10 also includes an authentication apparatus 24 that uses one or more RFID communications 26 or other suitable wireless communication (e.g., near field communication/NFC) to obtain gesture input 28 from the passive wearable device 14, which may function as a passive RFID tag, a battery-assisted passive RFID tag, and so forth. The RFID communications 26 may be conducted at an appropriate frequency such as, for example, low frequency (LF, e.g., 125-134 kHz), high frequency (HF, e.g., 13.56 MHz), ultra high frequency (UHF, e.g., 856-960 MHz), etc., depending on read range and power conditions.

The passive wearable device 14 may also include suitable capacitors (not shown) to ensure stable delivery of received power to the device 14. Thus, the computing system 10 may use a power source 30 to conduct a scan/interrogation of the passive wearable device 14, wherein the scan applies power to the passive wearable device 14. If the gesture input 28 (e.g., contained in one or more RFID codes) corresponds to a known gesture in the information 22, the authentication apparatus 24 may grant the user 12 access to the computing system 10. Otherwise, the authentication apparatus 24 may deny the user 12 access to the computing system 10. The computing system 10 may use the display 16 and/or other suitable UI to indicate to the user 12 when a login gesture should be made.

Figure 1B:
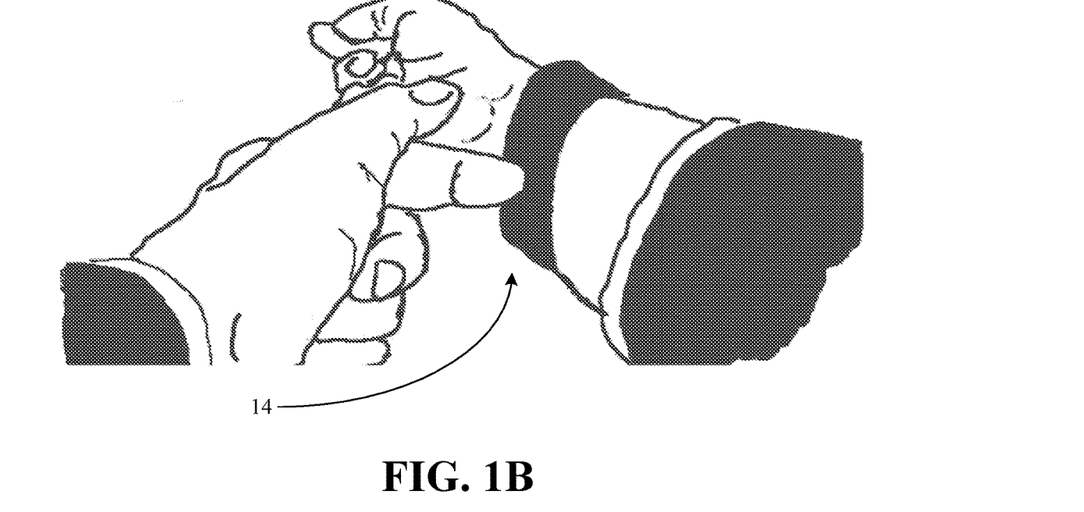
FIG. 1B is an illustration of an example of a passive wearable device having a watch form factor and a circuit completer according to an embodiment.

Of particular note is that the illustrated solution eliminates any need for physical interaction between the user 12 and the computing system 10 during authentication and obviates any concern over the user 12 remembering and/or entering passwords, PINs, user IDs, etc. Moreover, the illustrated solution may eliminate costly cameras, decrease storage requirements, and reduce power consumption. Additionally, the wearable device 14 may have a form factor such as, for example, a ring, watch or bracelet form factor, that facilitates a less cumbersome authentication process. FIG. 1B is an illustration of an example of the passive wearable device 14 having a watch form factor and a circuit completer according to an embodiment.

Figure 2:
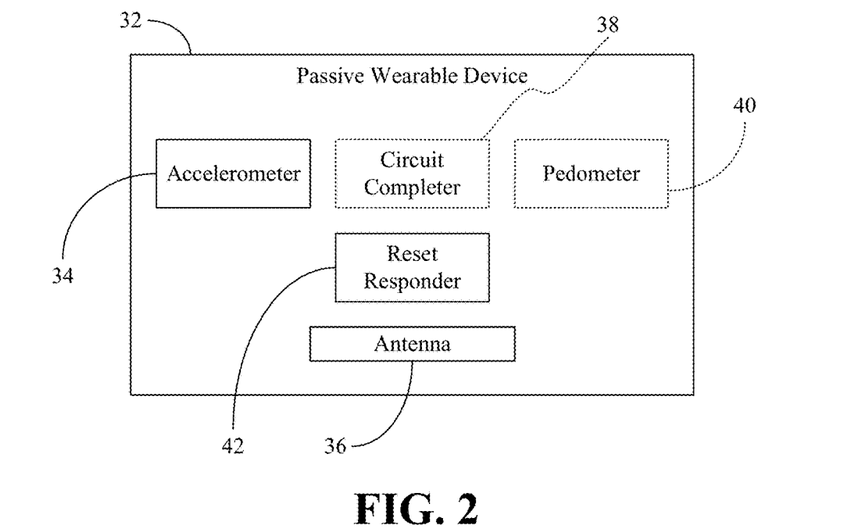
FIG. 2 is a block diagram of an example of a passive wearable device according to an embodiment.

FIG. 2 shows a passive wearable device 32 (e.g., passive RFID tag, battery-assisted passive RFID tag, etc.), which may readily be substituted for the passive wearable device 14 (FIG. 1), already discussed. In the illustrated example, the passive wearable device 32 includes an accelerometer 34 or other suitable motion sensor that documents gesture input such as the gesture input 28 (FIG. 1), in the form of one or more RFID codes and transmits the codes via an antenna 36 in response to a scan/interrogation by a remote authentication apparatus such as, for example, the authentication apparatus 24 (FIG. 1). Alternatively, the passive wearable device 32 may use a circuit completer 38 to document the gesture input, wherein each finger tap by the user on a physical gap between two contacts may complete the circuit and contribute to the generation of the RFID code(s). Thus, a particular sequence of finger taps by the user may be used to generate an RFID code. For example, the time between and duration of each tap might determine an amount by which to increment the RFID code so that the gesture input reflects a unique passcode at the end of the sequence. In one example, the accelerometer 34 and/or the circuit completer 38 may document the gesture input while the passive wearable device 14 is momentarily powered by the authentication apparatus (e.g., during the scan/interrogation).

Alternatively, an unpowered version of the accelerometer 34 may be used to document the gesture input. For example, a fully compliant bistable mechanism (FCBM) may store threshold acceleration measurements mechanically, eliminating the need for electrical power. The sensorpsilas state may be read wirelessly via a passive RFID tag, wherein the G-force needed to exceed the shock threshold may be varied by changing the mass of the FCBM. Thus, the unpowered version may enable the user to make the appropriate hand gesture(s) before coming into proximity with the computing system (e.g., in a private setting) and transfer the gesture input to the computing device at a later time.

In another example, a pedometer 40 may mechanically and/or digitally document the gesture input while no power is applied to the passive wearable device 32. Thus, as the pedometer 40 rocks back and forth, a spring-biased escapement pendulum (e.g., "see-saw" type of lever) might advance one or more gear wheels within the pedometer 40. Varying the size of the pendulum, the gears and spring adjustment may enable different sensitivity to varying gesture amplitudes to be achieved. Other power-free gesture input documentation approaches may also be used.

The passive wearable device 32 may also include a reset responder 42 to reset RFID codes in response to instructions/triggers from the authentication apparatus. Such an approach may be used by the authentication apparatus after successful and/or unsuccessful login attempts in order to prevent unauthorized access to the computing system (e.g., after a bona fide user has made a recognized gesture). Low-power encryption of the RFID codes may also be used to prevent unauthorized access to the computing system.

Figure 3:
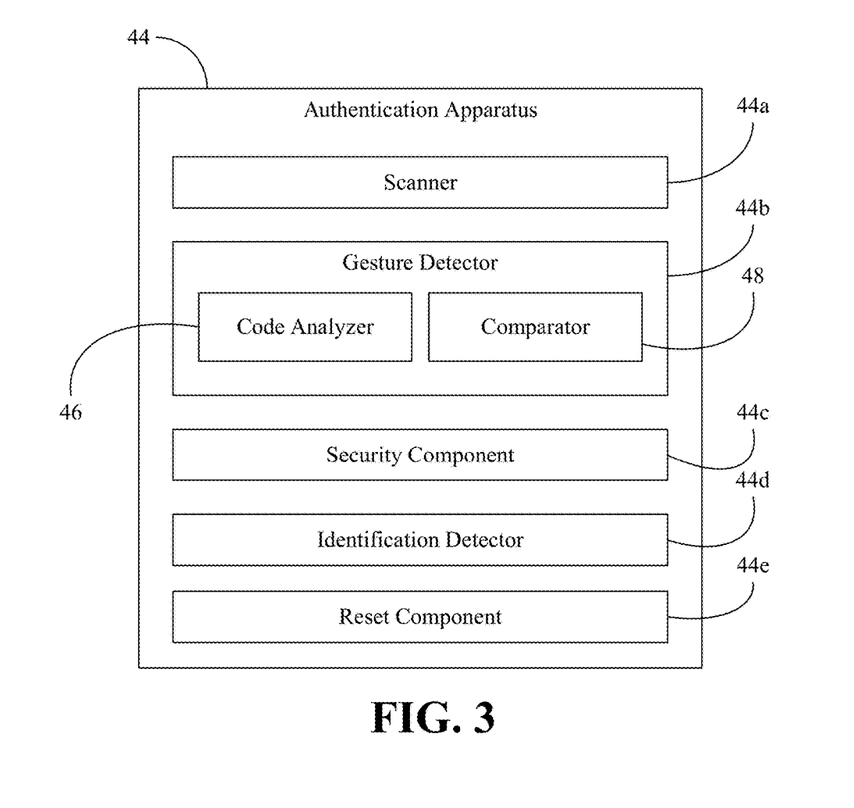
FIG. 3 is a block diagram of an example of an authentication apparatus according to an embodiment.

FIG. 3 shows an authentication apparatus 44 (44a-44e) that may be used to authenticate users attempting to access a computing system. Accordingly, the authentication apparatus 44 may be readily substituted for the authentication apparatus 24 (FIG. 1), already discussed. In the illustrated example, a scanner 44a may receive one or more RFID codes from a passive wearable device (e.g., passive RFID tag, battery-assisted passive RFID tag, etc.). More particularly, the scanner 44a may conduct a scan of the passive wearable device, wherein the scan may apply power to the passive wearable device and the one or more RFID codes are received in response to the scan. Moreover, a gesture detector 44b may identify gesture input in at least one of the RFID code(s). Additionally, a security component 44c may grant access to the computing system if the gesture input corresponds to a known gesture. If, on the other hand, the gesture input does not correspond to a known gesture, the security component 44c may deny access to the computing system.

In one example, the gesture detector 44b includes a code analyzer 46 to detect a change in at least one of the one or more RFID codes, wherein a comparator 48 may compare the detected change to an expected change associated with the known gesture. The change in the RFID code may be a function of the type of motion detected by an accelerometer such as the accelerometer 34 (FIG. 2), the sequence of finger taps detected by a circuit completer such as the circuit completer 38 (FIG. 2), the type of motion detected by a pedometer such as the pedometer 40 (FIG. 2), and so forth.

The illustrated authentication apparatus 44 also includes an identification detector 44d to detect user ID information in at least one of the RFID code(s), wherein the access may be granted or denied further based on the user ID information. The user ID information may be associated with specific known gestures (e.g., resulting from offline training) in order to enable the authentication apparatus 44 to distinguish between different users. For example, the passive wearable device might contain a separate RFID code that references the particular user (e.g., registered owner of the passive wearable device). In such a case, the RFID code for the user ID information may be transferred to the authentication apparatus 44 in addition to the RFID code for the gesture input (e.g., prior to the user making the hand gesture but during the scan/interrogation). In another example, a single RFID code may document both the user ID information and the gesture input. The authentication apparatus 44 may also include a reset component 44e to instruct the passive wearable device to reset the RFID code corresponding to the gesture input (e.g., in order to prevent subsequent unauthorized access to the computing system). Low-power encryption of the RFID codes may also be used to prevent unauthorized access to the computing system.

Figure 4A:
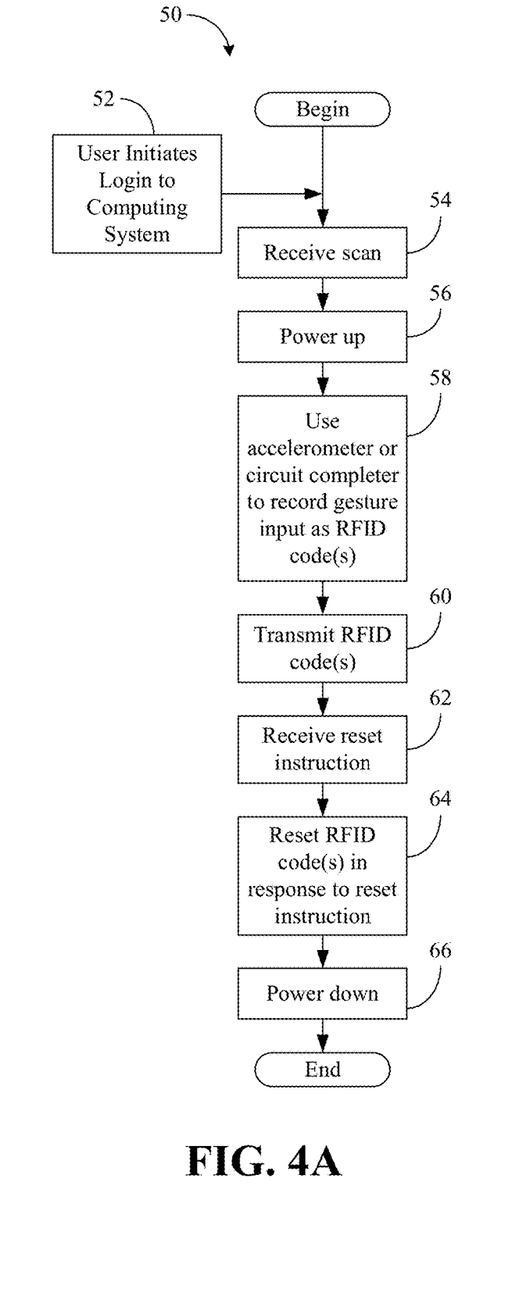
FIGS. 4A and 4B are flowcharts of examples of methods of operating a passive wearable device according to embodiments.

FIG. 4A shows one approach to a method 50 of operating a passive wearable device. The method 50 may generally be implemented in a passive wearable device such as, for example, the passive wearable device 32 (FIG. 2), already discussed. More particularly, the method 50 may be implemented as a module or related component in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 50 may be written in any combination of one or more programming languages, including an object oriented programming language such as JAVA, SMALLTALK, C++ or the like and conventional procedural programming languages, such as the "C" programming language or similar programming languages.

Illustrated processing block 52 provides for a user initiation of a login to a computing system. An RFID scan may be received from an authentication apparatus at block 54, wherein the passive wearable device may power up at block 56. Illustrated block 58 uses a component such as an accelerometer or a circuit completer to record gesture input as one or more RFID codes. The RFID code(s) may be transmitted to the authentication apparatus at block 60. Additionally, a reset instruction may be received at block 62, wherein block 64 may reset one or more RFID codes in response to the reset instruction. Block 64 may reset RFID code(s) associated with gesture input as well as RFID code(s) associated with user ID information (e.g., if a new user is being registered). Illustrated block 66 powers down the passive wearable device (e.g., at the end of the scan/interrogation).

Figure 4B:
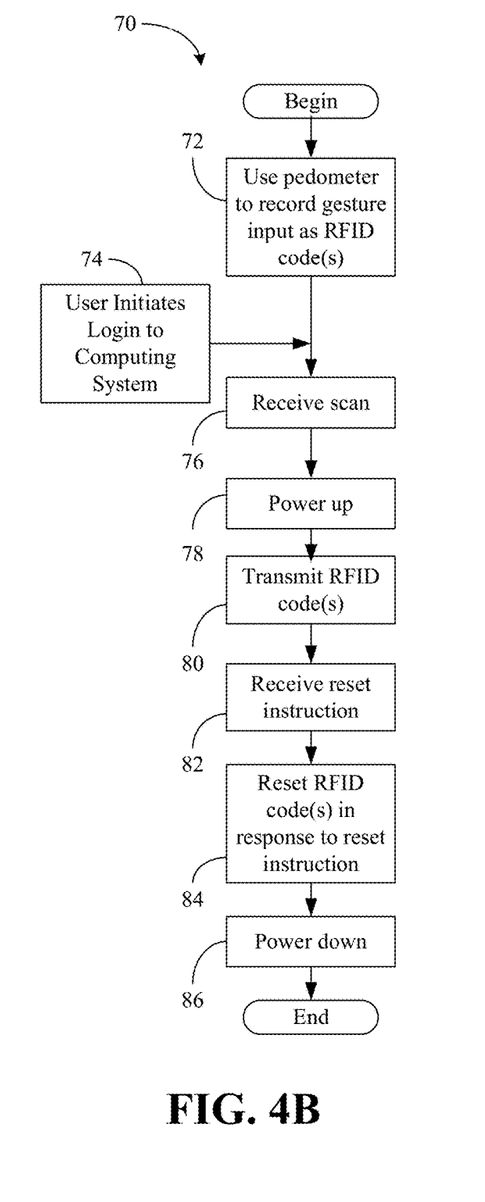

FIG. 4B shows another approach to a method 70 of operating a passive wearable device. The method 70 may generally be implemented in a passive wearable device such as, for example, the passive wearable device 32 (FIG. 2), already discussed. More particularly, the method 70 may be implemented as a module or related component in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 72 provides for using a component such as a pedometer to record gesture input as one or more RFID codes (e.g., without power), wherein a user initiated login to a computing system may take place at block 74. An RFID scan may be received from an authentication apparatus at block 76, wherein the passive wearable device may power up at block 78. The RFID code(s) may be transmitted to the authentication apparatus at block 80. Additionally, a reset instruction may be received at block 82, wherein block 84 may reset one or more RFID codes in response to the reset instruction. Block 84 may reset RFID code(s) associated with gesture input as well as RFID code(s) associated with user ID information (e.g., if a new user is being registered). Illustrated block 86 powers down the passive wearable device (e.g., at the end of the scan/interrogation).

Figure 5:
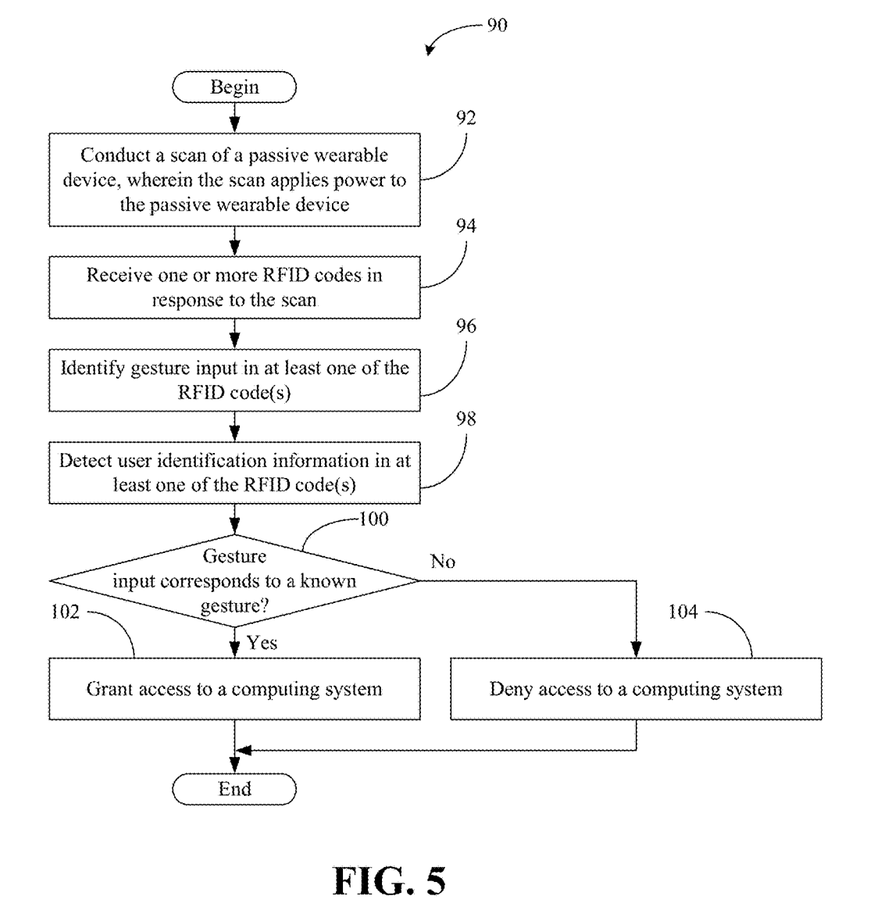
FIG. 5 is a flowchart of an example of a method of operating an authentication apparatus according to an embodiment.

FIG. 5 shows a method 90 of operating an authentication apparatus. The method 90 may generally be implemented in authentication apparatus such as, for example, the authentication apparatus 24 (FIG. 1) and/or the authentication apparatus 44 (FIG. 3), already discussed. More particularly, the method 90 may be implemented as a module or related component in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 92 provides for conducting a scan of a passive wearable device, wherein the scan momentarily applies power to the passive wearable device. One or more RFID codes may be received from the passive wearable device at block 94 in response to the scan. Gesture input may be identified at block 96 in at least one of the one or more RFID codes. As already noted, block 96 may include detecting a change in at least one of the RFID code(s). Additionally, block 98 may detect user ID information in at least one of the one or more RFID codes, wherein a determination may be made at block 100 as to whether the gesture input corresponds to a known gesture. Thus, block 100 might include comparing a detected change in at least one of the RFID code(s) to an expected change associated with a known gesture. Block 100 may take into consideration the user ID information, if appropriate. If the gesture input corresponds to a known gesture, illustrated block 102 grants access to the computing system. Otherwise, block 104 may deny access to the computing system. Blocks 102 and/or 104 may also provide for instructing the passive wearable device to reset the RFID code containing the gesture input.

Figure 6:
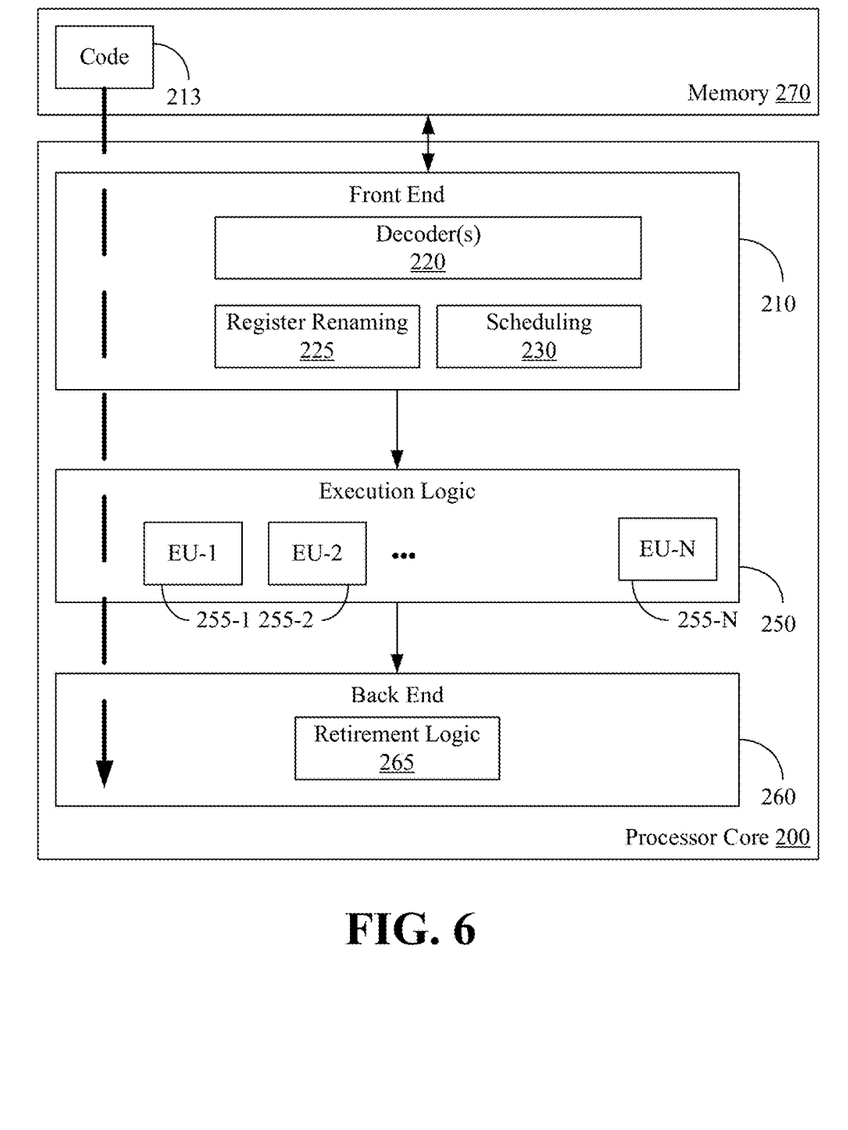
FIG. 6 is a block diagram of an example of a processor according to an embodiment.

FIG. 6 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 6, a processing element may alternatively include more than one of the processor core 200 illustrated in FIG. 6. The processor core 200 may be a single-threaded core or, for at least one embodiment, the processor core 200 may be multithreaded in that it may include more than one hardware thread context (or "logical processor") per core.

FIG. 6 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 50 (FIG. 4A), the method 70 (FIG. 4B) and/or the method 90 (FIG. 5), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 6, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 7:
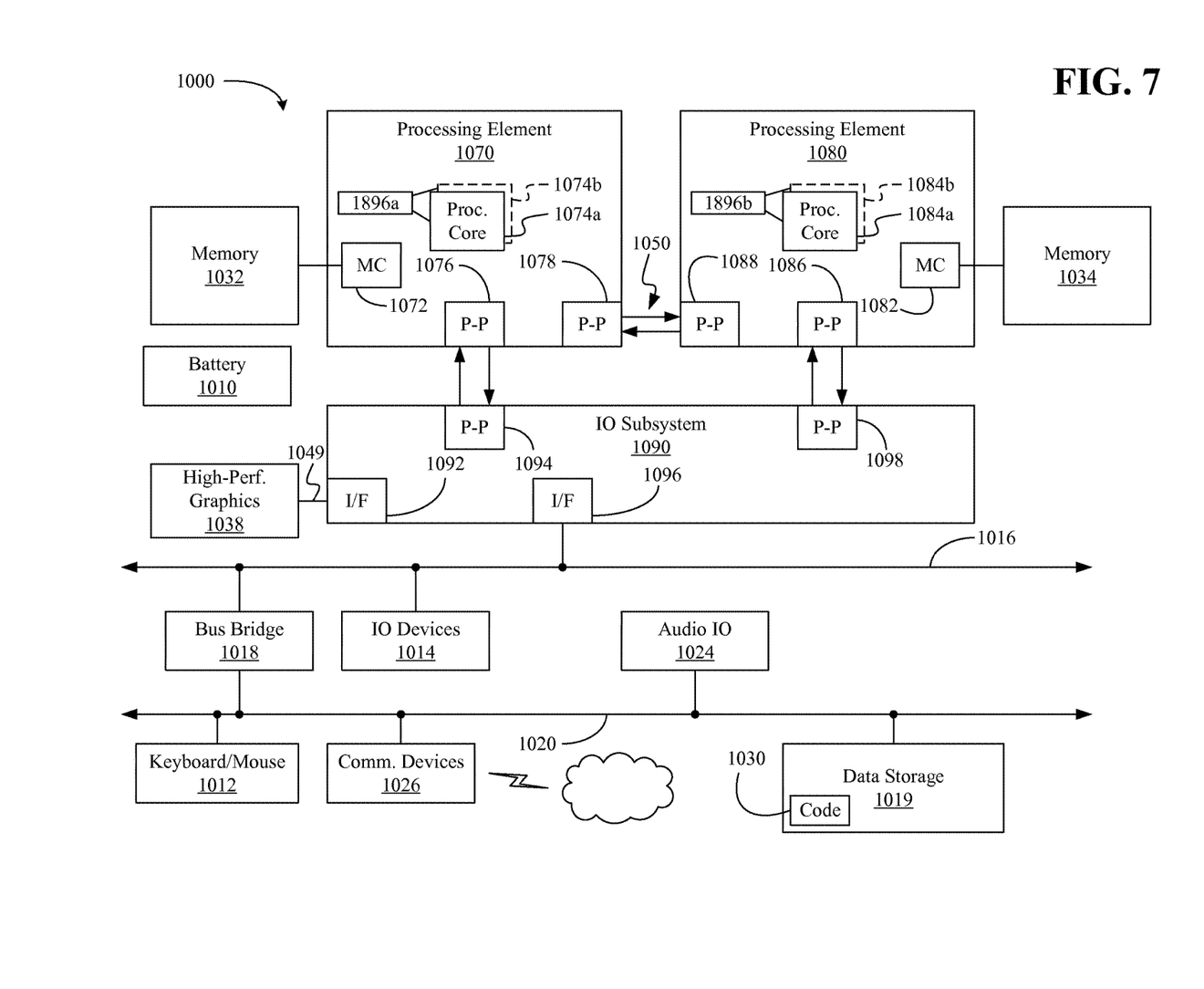
FIG. 7 is a block diagram of an example of a computing system according to an embodiment.

Referring now to FIG. 7, shown is a block diagram of a computing system 1000 embodiment in accordance with an embodiment. Shown in FIG. 7 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner similar to that discussed above in connection with FIG. 6.

Each processing element 1070, 1080 may include at least one shared cache 1896*a*, 1896*b*. The shared cache 1896*a*, 1896*b* may store data (e.g., instructions) that are utilized by one or more components of the processor, such as the cores 1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 7, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 7, various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 50 (FIG. 4A), the method 70 (FIG. 4B) and/or the method 90 (FIG. 5), already discussed, and may be similar to the code 213 (FIG. 6), already discussed. Further, an audio I/O 1024 may be coupled to second bus 1020 and a battery 1010 may supply power to the computing system 1000.

Note that other embodiments are contemplated. For example, instead of the point-to-point architecture of FIG. 7, a system may implement a multi-drop bus or another such communication topology. Also, the elements of FIG. 7 may alternatively be partitioned using more or fewer integrated chips than shown in FIG. 7.

Additional Notes and Examples

Example 1 may include a secure computing system comprising a memory to store information regarding a known gesture and an authentication apparatus including a scanner to receive one or more radio frequency identifier (RFID) codes from a passive wearable device, a gesture detector to identify gesture input in at least one of the one or more RFID codes, and a security component to grant access to the computing system if the gesture input corresponds to the known gesture.

Example 2 may include the computing system of Example 1, wherein the gesture detector includes a code analyzer to detect a change in at least one of the one or more RFID codes to identify the gesture input; and a comparator to compare the detected change to an expected change associated with the known gesture.

Example 3 may include the computing system of Example 1, wherein the authentication apparatus further includes an identification detector to detect user identification information in at least one of the one or more RFID codes, and wherein the access is to be granted based at least in part on the user identification information.

Example 4 may include the computing system of Example 1, wherein the authentication apparatus further includes a reset component to instruct the passive wearable device to reset an RFID code containing the gesture input.

Example 5 may include the computing system of Example 1, wherein the scanner is to conduct a scan of the passive wearable device, and wherein the scan is to apply power to the passive wearable device and the one or more RFID codes are to be received in response to the scan.

Example 6 may include the computing system of any one of Examples 1 to 5, wherein the security component is to deny access to the computing system if the gesture input does not correspond to the known gesture.

Example 7 may include an authentication apparatus comprising a scanner to receive one or more radio frequency identifier (RFID) codes from a passive wearable device, a gesture detector to identify gesture input in at least one of the one or more RFID codes, and a security component to grant access to the computing system if the gesture input corresponds to a known gesture.

Example 8 may include the apparatus of claim 7, wherein the gesture detector includes a code analyzer to detect a change in at least one of the one or more RFID codes to identify the gesture input; and a comparator to compare the detected change to an expected change associated with the known gesture.

Example 9 may include the apparatus of claim 7, further including an identification detector to detect user identification information in at least one of the one or more RFID codes, and wherein the access is to be granted based at least in part on the user identification information.

Example 10 may include the apparatus of claim 7, further including a reset component to instruct the passive wearable device to reset an RFID code containing the gesture input.

Example 11 may include the apparatus of claim 7, wherein the scanner is to conduct a scan of the passive wearable device, and wherein the scan is to apply power to the passive wearable device and the one or more RFID codes are to be received in response to the scan.

Example 12 may include the apparatus of any one of claims 7 to 11, wherein the security component is to deny access to the computing system if the gesture input does not correspond to the known gesture.

Example 13 may include a method of operating an authentication apparatus comprising receiving one or more radio frequency identifier (RFID) codes from a passive wearable device, identifying gesture input in at least one of the one or more RFID codes, and granting access to a computing system if the gesture input corresponds to a known gesture.

Example 14 may include the method of Example 13, wherein identifying the gesture input includes detecting a change in at least one of the one or more RFID codes and the method further includes comparing the detected change to an expected change associated with the known gesture.

Example 15 may include the method of Example 13, further including detecting user identification information in at least one of the one or more RFID codes, wherein the access is granted based at least in part on the user identification information.

Example 16 may include the method of Example 13, further including instructing the passive wearable device to reset an RFID code containing the gesture input.

Example 17 may include the method of Example 13, further including conducting a scan of the passive wearable device, wherein the scan applies power to the passive wearable device and the one or more RFID codes are received in response to the scan.

Example 18 may include the method of any one of Examples 13 to 17, further including denying the access to the computing system if the gesture input does not correspond to the known gesture.

Example 19 may include at least one computer readable storage medium comprising a set of instructions, which when executed by a computing system, cause the computing system to receive one or more radio frequency identifier (RFID) codes from a passive wearable device, identify gesture input in at least one of the one or more RFID codes, and grant access to the computing system if the gesture input corresponds to a known gesture.

Example 20 may include the at least one computer readable storage medium of Example 19, wherein the instructions, when executed, cause the computing system to detect a change in at least one of the one or more RFID codes to identify the gesture input; and compare the detected change to an expected change associated with the known gesture.

Example 21 may include the at least one computer readable storage medium of Example 19, wherein the instructions, when executed, cause the computing system to detect user identification information in at least one of the one or more RFID codes, wherein the access is to be granted based at least in part on the user identification information.

Example 22 may include the at least one computer readable storage medium of Example 19, wherein the instructions, when executed, cause the computing system to instruct the passive wearable device to reset an RFID code containing the gesture input.

Example 23 may include the at least one computer readable storage medium of Example 19, wherein the instructions, when executed, cause the computing system to conduct a scan of the passive wearable device, and wherein the scan is to apply power to the passive wearable device and the one or more RFID codes are to be received in response to the scan.

Example 24 may include the at least one computer readable storage medium of any one of Examples 19 to 23, wherein the instructions, when executed, cause the computing system to deny the access to the computing system if the gesture input does not correspond to the known gesture.

Example 25 may include the at least one computer readable storage medium of any one of Examples 19 to 23, wherein the one or more RFID codes are to be received from one or more of a passive RFID tag or a battery-assisted passive RFID tag.

Example 26 may include an authentication apparatus comprising means for receiving one or more radio frequency identifier (RFID) codes from a passive wearable device; means for identifying gesture input in at least one of the one or more RFID codes; and means for granting access to a computing system if the gesture input corresponds to a known gesture.

Example 27 may include the apparatus of Example 26, wherein the means for identifying the gesture input includes means for detecting a change in at least one of the one or more RFID codes and the apparatus further includes means for comparing the detected change to an expected change associated with the known gesture.

Example 28 may include the apparatus of Example 26, further including means for detecting user identification information in at least one of the one or more RFID codes, wherein the access is to be granted based at least in part on the user identification information.

Example 29 may include the apparatus of Example 26, further including means for instructing the passive wearable device to reset an RFID code containing the gesture input.

Example 30 may include the apparatus of Example 26, further including means for conducting a scan of the passive wearable device, wherein the scan is to apply power to the passive wearable device and the one or more RFID codes are received in response to the scan.

Example 31 may include the apparatus of any one of Examples 26 to 30, further including means for denying the access to the computing system if the gesture input does not correspond to the known gesture.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. A computing system comprising:
a memory to store information regarding a known gesture; and
an authentication apparatus including:
a scanner to receive, via low-power encryption, one or more radio frequency identifier (RFID) codes from a passive wearable device, wherein the scanner includes a communications circuit configured to operate at an operating frequency based on one or more of a read range or power conditions,
a gesture detector, implemented in one or more of configurable logic or fixed-functionality hardware logic, to identify gesture input in at least one of the one or more RFID codes, wherein the passive wearable device includes an accelerometer configured to store, without the use of electrical power, threshold acceleration measurements mechanically corresponding to the one or more RFID codes, wherein a G-force to exceed the threshold acceleration is varied by changing a mass of the accelerometer, and
a security component, implemented in one or more of configurable logic or fixed-functionality hardware logic, to grant access to the computing system if the gesture input corresponds to the known gesture.

2. The computing system of claim 1, wherein the gesture detector includes:
a code analyzer, implemented in one or more of configurable logic or fixed-functionality hardware logic, to detect a change in at least one of the one or more RFID codes to identify the gesture input; and
a comparator, implemented in one or more of configurable logic or fixed-functionality hardware logic, to compare the detected change to an expected change associated with the known gesture.

3. The computing system of claim 1, wherein the authentication apparatus further includes an identification detector, implemented in one or more of configurable logic or fixed-functionality hardware logic, to detect user identification information in at least one of the one or more RFID codes, and wherein the access is to be granted based at least in part on the user identification information.

4. The computing system of claim 1, wherein the authentication apparatus further includes a reset component, implemented in one or more of configurable logic or fixed-functionality hardware logic, to instruct the passive wearable device to reset an RFID code containing the gesture input.

5. The computing system of claim 1, wherein the scanner is to conduct a scan of the passive wearable device, and wherein the scan is to apply power to the passive wearable device and the one or more RFID codes are to be received, via the communications circuit, in response to the scan.

6. The computing system of claim 1, wherein the security component is to deny access, by communicating to deny access via the communications circuit, to the computing system if the gesture input does not correspond to the known gesture.

7. An apparatus comprising:
a scanner to receive, via low-power encryption, one or more radio frequency identifier (RFID) codes from a passive wearable device, wherein the scanner includes a communications circuit configured to operate at an operating frequency based on one or more of a read range or power conditions;
a gesture detector, implemented in one or more of configurable logic or fixed-functionality hardware logic, to identify gesture input in at least one of the one or more RFID codes, wherein the passive wearable device includes an accelerometer configured to store, without the use of electrical power, threshold acceleration measurements mechanically corresponding to the one or more RFID codes, wherein a G-force to exceed the threshold acceleration is varied by changing a mass of the accelerometer; and a security component, implemented in one or more of configurable logic or fixed-functionality hardware logic, to grant access to the computing system if the gesture input corresponds to a known gesture.

8. The apparatus of claim 7, wherein the gesture detector includes:

a code analyzer, implemented in one or more of configurable logic or fixed-functionality hardware logic, to detect a change in at least one of the one or more RFID codes to identify the gesture input; and a comparator, implemented in one or more of configurable logic or fixed-functionality hardware logic, to compare the detected change to an expected change associated with the known gesture.

9. The apparatus of claim 7, further including an identification detector, implemented in one or more of configurable logic or fixed-functionality hardware logic, to detect user identification information in at least one of the one or more RFID codes, and wherein the access is to be granted based at least in part on the user identification information.

10. The apparatus of claim 7, further including a reset component, implemented in one or more of configurable logic or fixed-functionality hardware logic, to instruct the passive wearable device to reset an RFID code containing the gesture input.

11. The apparatus of claim 7, wherein the scanner is to conduct a scan of the passive wearable device, and wherein the scan is to apply power to the passive wearable device and the one or more RFID codes are to be received, via the communications circuit, in response to the scan.

12. The apparatus of claim 7, wherein the security component is to deny access, by communicating to deny access via the communications circuit, to the computing system if the gesture input does not correspond to the known gesture.

13. A method comprising:

receiving, using a scanner, one or more radio frequency identifier (RFID) codes from a passive wearable device using low-power encryption, wherein the scanner includes a communications circuit configured to operate at an operating frequency based on one or more of a read range or one or more power conditions;

identifying gesture input, using a gesture detector implemented in one or more of configurable logic or fixed-functionality hardware logic, in at least one of the one or more RFID codes, wherein the passive wearable device includes an accelerometer configured to store, without the use of electrical power, threshold acceleration measurements mechanically corresponding to the one or more RFID codes, wherein a G-force to exceed the threshold acceleration is varied by changing a mass of the accelerometer; and granting access, using a security component implemented in one or more of configurable logic or fixed-functionality hardware logic, to a computing system if the gesture input corresponds to a known gesture.

14. The method of claim 13, wherein identifying the gesture input includes detecting, using a code analyzer implemented in one or more of configurable logic or fixed-functionality hardware logic, a change in at least one of the one or more RFID codes and the method further includes comparing, using a comparator implemented in one or more of configurable logic or fixed-functionality hardware logic, the detected change to an expected change associated with the known gesture.

15. The method of claim 13, further including detecting, using an identification detector implemented in one or more of configurable logic or fixed-functionality hardware logic, user identification information in at least one of the one or more RFID codes, wherein the access is granted based at least in part on the user identification information.

16. The method of claim 13, further including instructing a reset responder of the passive wearable device to reset an RFID code containing the gesture input, by communicating one or more reset RFID codes via the communications circuit to the reset responder.

17. The method of claim 13, further including conducting a scan of the passive wearable device, using the scanner, wherein the scan applies power to the passive wearable device and the one or more RFID codes are received, via the communications circuit, in response to the scan.

18. The method of claim 13, further including denying the access, by communicating to deny access via the communications circuit, to the computing system if the gesture input does not correspond to the known gesture.

19. At least one non-transitory computer readable storage medium comprising a set of instructions, which when executed by a computing system, cause the computing system to:

receive, via low-power encryption, using a communications circuit configured to operate at an operating frequency based on one or more of a read range or power conditions, one or more radio frequency identifier (RFID) codes from a passive wearable device, wherein the scanner includes;

identify gesture, using a gesture detector implemented in one or more of configurable logic or fixed-functionality hardware logic, input in at least one of the one or more RFID codes wherein the passive wearable device includes an accelerometer configured to store, without the use of electrical power, threshold acceleration measurements mechanically corresponding to the one or more RFID codes, wherein a G-force to exceed the threshold acceleration is varied by changing a mass of the accelerometer; and grant access, using a security component implemented in one or more of configurable logic or fixed-functionality hardware logic, to the computing system if the gesture input corresponds to a known gesture.

20. The at least one computer readable storage medium of claim 19, wherein the instructions, when executed, cause the computing system to:

detect, using a code analyzer implemented in one or more of configurable logic or fixed-functionality hardware logic, a change in at least one of the one or more RFID codes to identify the gesture input; and compare, using a comparator implemented in one or more of configurable logic or fixed-functionality hardware logic, the detected change to an expected change associated with the known gesture.

21. The at least one computer readable storage medium of claim 19, wherein the instructions, when executed, cause the computing system to detect, using an identification detector implemented in one or more of configurable logic or fixed-functionality hardware logic, user identification information in at least one of the one or more RFID codes, wherein the access is to be granted based at least in part on the user identification information.

22. The at least one computer readable storage medium of claim 19, wherein the instructions, when executed, cause the computing system to instruct a reset responder of the passive wearable device to reset an RFID code containing the gesture input, by communicating one or more reset RFID codes via the communications circuit to the reset responder.

23. The at least one computer readable storage medium of claim 19, wherein the instructions, when executed, cause the computing system to conduct a scan of the passive wearable device, using the scanner, and wherein the scan is to apply power to the passive wearable device and the one or more RFID codes are to be received, via the communications circuit, in response to the scan.

24. The at least one computer readable storage medium of claim 19, wherein the instructions, when executed, cause the computing system to deny the access, by communicating to deny access via the communications circuit, to the computing system if the gesture input does not correspond to the known gesture.

25. The at least one computer readable storage medium of claim 19, wherein the one or more RFID codes are to be received, via the communications circuit, from one or more of a passive RFID tag or a battery-assisted passive RFID tag.

* * * * *